E. A. BOHLMAN.
METALLIC POWER BELT.
APPLICATION FILED SEPT. 3, 1912.
1,114,850.
Patented Oct. 27, 1914.
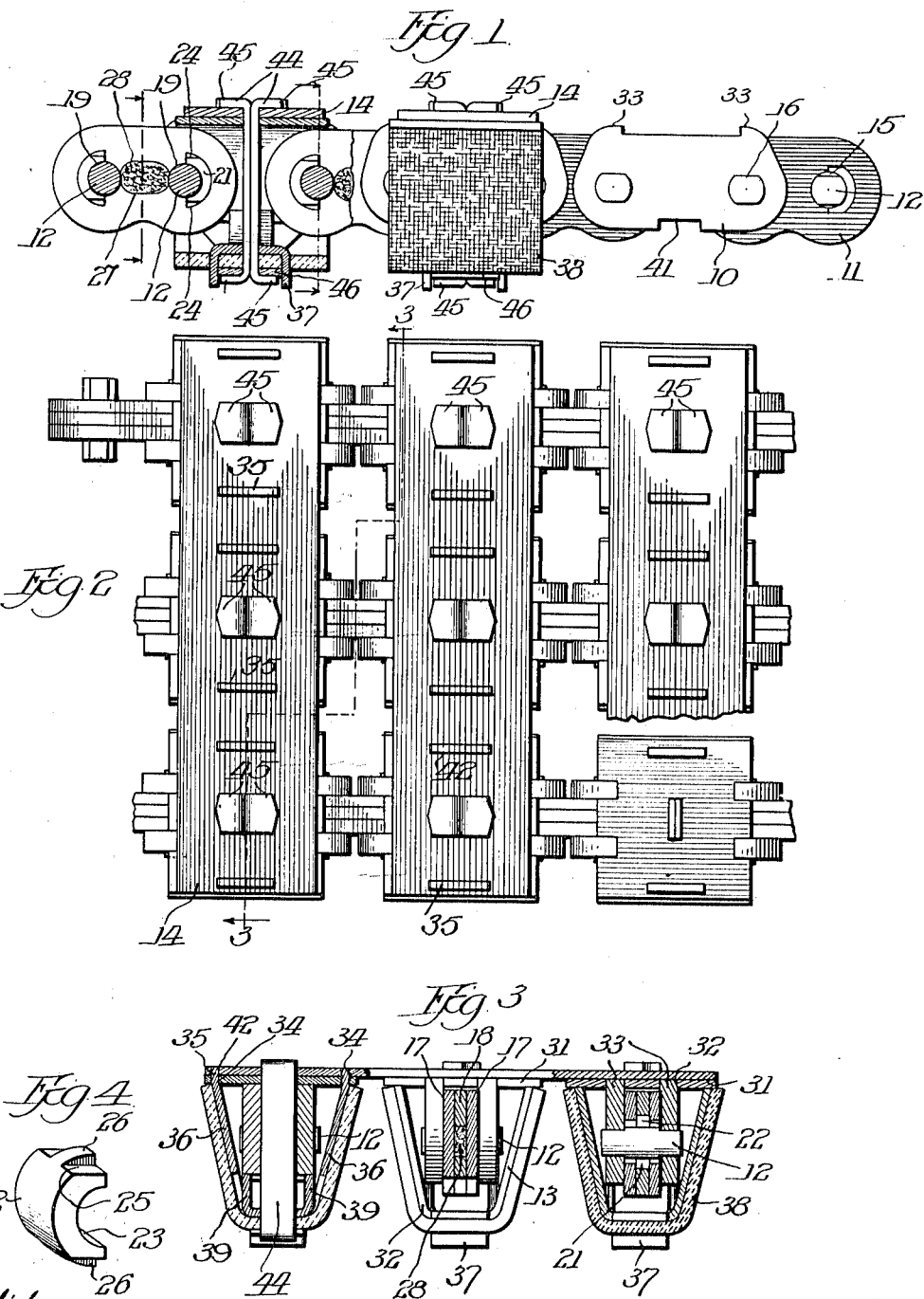

UNITED STATES PATENT OFFICE.

ERNEST A. BOHLMAN, OF CEDAR RAPIDS, IOWA, ASSIGNOR TO JAMES E. CAGNEY, JR., OF CHICAGO, ILLINOIS.

METALLIC POWER-BELT.

1,114,850.      Specification of Letters Patent.      Patented Oct. 27, 1914.

Application filed September 3, 1912. Serial No. 718,190.

*To all whom it may concern:*

Be it known that I, ERNEST A. BOHLMAN, a citizen of the United States, residing at Cedar Rapids, in the county of Linn and State of Iowa, have invented certain new and useful Improvements in Metallic Power-Belts, of which the following is a specification.

My invention relates in general to power belts for transmitting power from one point to another, and more particularly to that class of belts known as metallic or chain belts, and aims to provide a belt of this type which will be strong, durable and efficient, and at the same time sufficiently flexible to permit it to be used on pulleys of small diameter and on pulleys closely mounted together.

A further aim of the invention is to provide a belt of the character described wherein the surfaces which normally slide one over another will be of substantially harder material and possessed of greater wear-resisting qualities than the material forming the other parts of the belt, so constructing and arranging the parts that should the surfaces become worn during the operation of the belt they may be restored by the replacement of small and inexpensive members without requiring that any of the main parts of the belt be discarded.

A further object of the invention is to provide a power belt wherein the moving parts will be efficiently lubricated without danger of the distribution of the lubricant upon the surfaces of the belt which contact with the pulleys.

Another object of the invention is to provide a power belt which will be so shaped as to accurately fit the grooves of grooved pulleys, providing a belt which may be used with pulleys having a plurality of grooves, the members adapted to fit in one groove being connected to the members adapted to fit in the other grooves by simple, inexpensive and efficient means.

Further objects and advantages of the invention will be apparent as the invention is better understood from the following description which, taken in connection with the accompanying drawings, discloses one preferred embodiment thereof.

On the drawing:—Figure 1 is a side elevation shown partially in section of a power belt constructed in pursuance of my invention with some parts removed and others broken away; Fig. 2 is a top plan view of the belt shown in Fig. 1; Fig. 3 is a vertical sectional view taken on the line 3—3 of Fig. 2, and Fig. 4 is a perspective view showing one of the bearing elements used in the belt shown in Figs. 1 to 3.

In the present embodiment of my invention the belt is composed primarily of side bars 10, links 11, pins 12 connecting the side bars and links, frames 13 and transversely disposed connecting members 14. The side bars 10 are arranged in pairs and through each pair at each end is disposed a connecting pin 12. The pins 12 are preferably flattened at their ends, as at 15, to permit them to be firmly secured in the appropriately shaped recesses 16 of the side bars.

The links 11 in the embodiment of the invention herein described are composed of three parallelly arranged members 17 and 18 of like external form, although it will be obvious as the invention is better understood that any preferred number may be employed without departing from the spirit of the invention. Each of these members has two pin-receiving apertures 19 in which pins 12 are adapted to fit loosely, and communicating with these apertures in the direction of the ends of the link are also provided apertures 21 for the reception of a bearing member or block 22. This block is preferably of material substantially harder than that forming the link, and is provided with a suitably formed bearing surface 23 against which the pin 12 is adapted to bear when the portion of the belt containing the link is under tension. The apertures 21 in the outermost link members 17 are flattened at their ends as at 24 to engage with the flattened surfaces 25 of the block 22, and the central member 18 is provided with a larger aperture adapted to receive the outwardly extending portions 26 of the block.

In the present embodiment of the invention the bearing surface 23 is substantially semi-cylindrical in form and is adapted therefore to form one-half of the bearing for the pin 12, although it will be manifest a block may be employed which provides a bearing surface of substantially greater or less area. Within the member 18 is formed an additional aperture 27 communicating with both apertures 19 and adapted to contain a lubricating cartridge 28 for the lubrication of the pins 12.

Each of the frames 13 inclosing the pairs of side bars is preferably composed of a top spacing plate 31 and a housing 32. The plate 31 is preferably recessed at its ends as at 32 to receive the upwardly extending retaining lugs 33, one of which is provided at each end of each side bar, and these plates have also an elongated slot or aperture 34 at each side thereof for the reception of an ear 35 formed at each end of the housing 32. The housing in the present instance is shown as being formed of a metal strap bent in the arch shape shown to provide a pair of upwardly extending walls 36. The material forming the intermediate portions connecting the bottom of the walls is left substantially flat, and the ends of this portion are severed from the bottom portions of the walls and bent downwardly substantially at right angles to form the lugs 37 which extend through a suitable sheet 38 of frictional material which is disposed upon the inclined side walls 36. Lugs 39 are stamped from the material forming the side walls 36, and are bent inwardly to engage in slots 41 formed in the lower surface of the side bars. Extending across a number of spacing plates 31 and preferably having recesses 42 coinciding with the recesses 34, through which extend the ears 35 of the housings, is a flat plate 14. Through the plate 14, the spacing plate 31, the bottom portion of the housing 32 and the sheet of frictional material 38 are alined apertures in which a pair of keys 44 are positioned to bind the parts mentioned firmly together. These keys have their ends 45 oppositely bent, as shown in Figs. 1 and 2, and beneath the frictional material is provided a washer 46 to prevent the ends of the keys from sinking into the sheet of flexible material. Although in the present instance a pair of keys such as those just described are provided, it is apparent that other forms of fastening means may with equal efficiency be employed.

It is thought that this invention and many of its aims and advantages will be understood from the foregoing without further description, and it is obvious that various changes may be made in the form, construction and arrangement of the parts without departing from the spirit and scope of the invention, or sacrificing any of its advantages, the form hereinbefore disclosed being merely one preferred embodiment thereof.

I claim:—

1. A power belt comprising a plurality of elements forming parallel side bars, a plurality of elements forming parallel links, said links being pivotally secured to said side bars, frames connected to parallelly arranged elements, and a plurality of members disposed transversely of the belt and each secured to a plurality of the said frames.

2. A power belt comprising a plurality of side bars arranged in pairs, links alternating with said pairs and pivotally secured thereto, frames connected to said pairs of side bars, and flat members disposed transversely of the belt and secured to a plurality of the frames embracing the side bars.

3. A power belt comprising side bars arranged in pairs, links alternating with and pivotally secured to said side bars, frames surrounding a plurality of pairs of side bars, a flat member disposed transversely of the belt and secured to a plurality of said frames, and means disposed between the side bars and through the said frames and flat member for securing the parts in position.

4. A power belt comprising side bars arranged in pairs, links alternating with and pivotally connected to said pairs of side bars, a frame surrounding a pair of side bars comprising a spacing member resting on said side bars, a V-shaped member disposed beneath the said side bars and having the ends thereof disposed through the spacing member, and means disposed through the said spacing member and the bottom of the V-shaped member for securing the parts in position.

5. A power belt comprising side bars arranged in pairs, links alternating with said pairs of side bars and pivotally secured thereto, a frame surrounding a pair of side bars comprising a top spacing member, a V-shaped member having its ends disposed through and extending above said spacing member, and a flat top member disposed transversely of the belt provided with recesses adapted to receive and retain the upwardly extending ends of the V-shaped members forming a plurality of frames.

6. A power belt comprising side bars arranged in pairs, links alternating with and pivotally secured to said pairs of side bars, a frame surrounding a pair of side bars comprising a spacing member and a V-shaped member, a strip of frictional material disposed without said V-shaped member, and means disposed through the said strip of frictional material, the V-shaped and spacing member for retaining the parts in position.

ERNEST A. BOHLMAN.

Witnesses:
IRA J. WILSON,
M. A. KIDDIE.